(12) United States Patent
Berroteran Gil et al.

(10) Patent No.: US 9,828,971 B2
(45) Date of Patent: Nov. 28, 2017

(54) SYSTEM AND METHOD FOR OPTIMIZING WIND TURBINE OPERATION

(71) Applicant: General Electric Company, Schenectady, NY (US)

(72) Inventors: Igor Berroteran Gil, Salem, VA (US); Anthony Michael Klodowski, Hardy, VA (US); Werner Gerhard Barton, Gescher (DE)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 14/548,570

(22) Filed: Nov. 20, 2014

(65) Prior Publication Data

US 2016/0146191 A1    May 26, 2016

(51) Int. Cl.
| | |
|---|---|
| F03D 9/00 | (2016.01) |
| F03D 7/04 | (2006.01) |
| H01F 29/04 | (2006.01) |
| H02P 9/00 | (2006.01) |
| F03D 7/02 | (2006.01) |
| H02P 13/06 | (2006.01) |
| F03D 9/25 | (2016.01) |

(52) U.S. Cl.
CPC .......... *F03D 9/003* (2013.01); *F03D 7/0272* (2013.01); *F03D 9/255* (2017.02); *H01F 29/04* (2013.01); *H02P 9/007* (2013.01); *H02P 13/06* (2013.01); *Y02E 10/723* (2013.01)

(58) Field of Classification Search
CPC ........ F03D 9/255; F03D 7/0272; H02P 13/06; H02P 9/007; H01F 29/04

USPC ..................................... 290/44, 55; 318/700
See application file for complete search history.

(56) References Cited

U.S. PATENT DOCUMENTS

| | | | |
|---|---|---|---|
| 6,323,618 B1 * | 11/2001 | Kitamura | H02J 3/1885 318/700 |
| 7,808,126 B2 | 10/2010 | Stiesdal | |
| 7,989,983 B2 * | 8/2011 | Folts | H02J 3/383 307/82 |
| 7,994,658 B2 | 8/2011 | Cardinal et al. | |
| 8,054,652 B2 | 11/2011 | Miftakhutdinov et al. | |
| 8,121,738 B2 * | 2/2012 | Teichmann | F03D 7/0284 290/44 |
| 8,570,772 B2 | 10/2013 | Morris et al. | |
| 8,610,306 B2 * | 12/2013 | Kirchner | F03D 7/0284 290/44 |

(Continued)

FOREIGN PATENT DOCUMENTS

| | | |
|---|---|---|
| ES | 2 428 390 | 11/2013 |
| JP | 4894604 | 1/2012 |

*Primary Examiner* — Viet Nguyen
(74) *Attorney, Agent, or Firm* — Dority & Manning, P.A.

(57) ABSTRACT

System and methods for optimizing operation of a wind turbine are disclosed. In one aspect, the method also includes determining, via a converter controller of a power converter, a tap position of a tap changer configured between the power grid and a primary winding of a transformer. Another step includes calculating, via the converter controller, a primary voltage of the primary winding as a function of the tap position. The method also includes implementing, via the converter controller, a control action if the primary voltage or a measured secondary voltage of a secondary winding of the transformer is outside of a predetermined voltage range.

17 Claims, 6 Drawing Sheets

(56) References Cited

U.S. PATENT DOCUMENTS

| | | | |
|---|---|---|---|
| 8,698,334 B2* | 4/2014 | Bo | H02J 3/1878 290/44 |
| 2004/0046530 A1* | 3/2004 | Hessling | H02P 9/04 322/29 |
| 2008/0093853 A1* | 4/2008 | Barker | H02P 9/007 290/44 |
| 2009/0096211 A1* | 4/2009 | Stiesdal | H02J 3/1835 290/44 |
| 2009/0218817 A1* | 9/2009 | Cardinal | F03D 7/028 290/44 |
| 2010/0109447 A1* | 5/2010 | Achilles | F03D 7/0284 307/153 |
| 2012/0112713 A1 | 5/2012 | Kuehn | |
| 2012/0294045 A1 | 11/2012 | Fornage et al. | |
| 2013/0114312 A1 | 5/2013 | Reichard et al. | |
| 2013/0116841 A1* | 5/2013 | Garcia | H02J 3/1878 700/287 |
| 2013/0307494 A1* | 11/2013 | Meinecke | H02J 3/1878 323/205 |

* cited by examiner

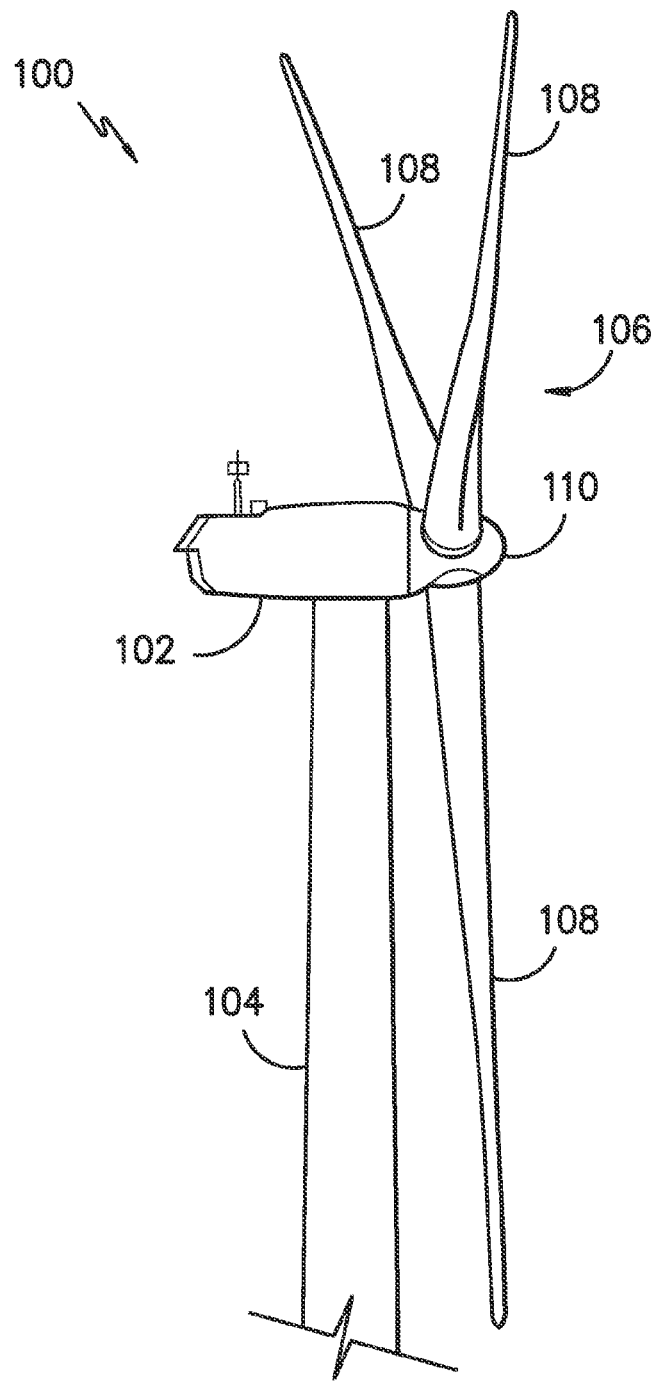
FIG. -1-

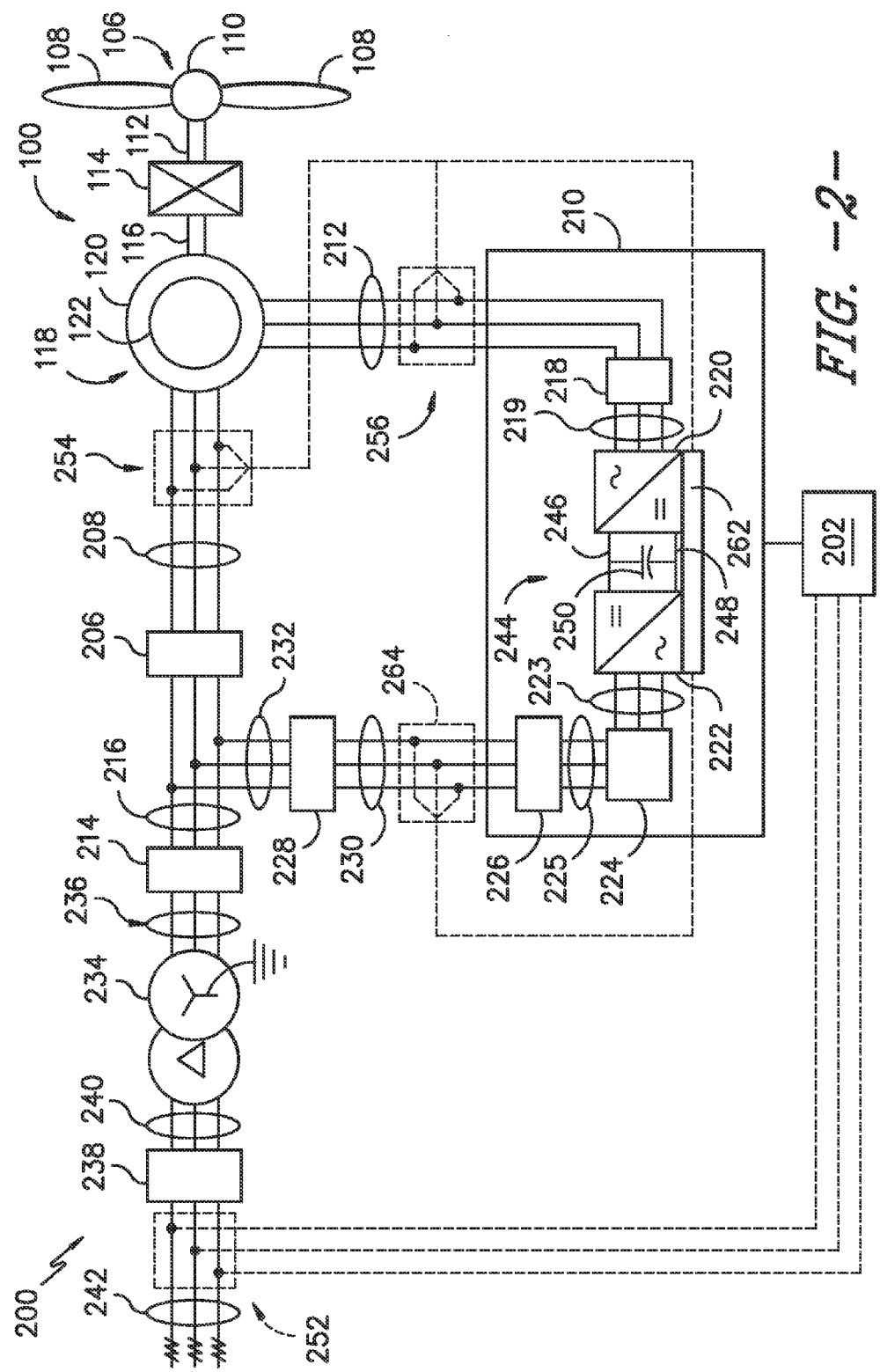
FIG. -2-

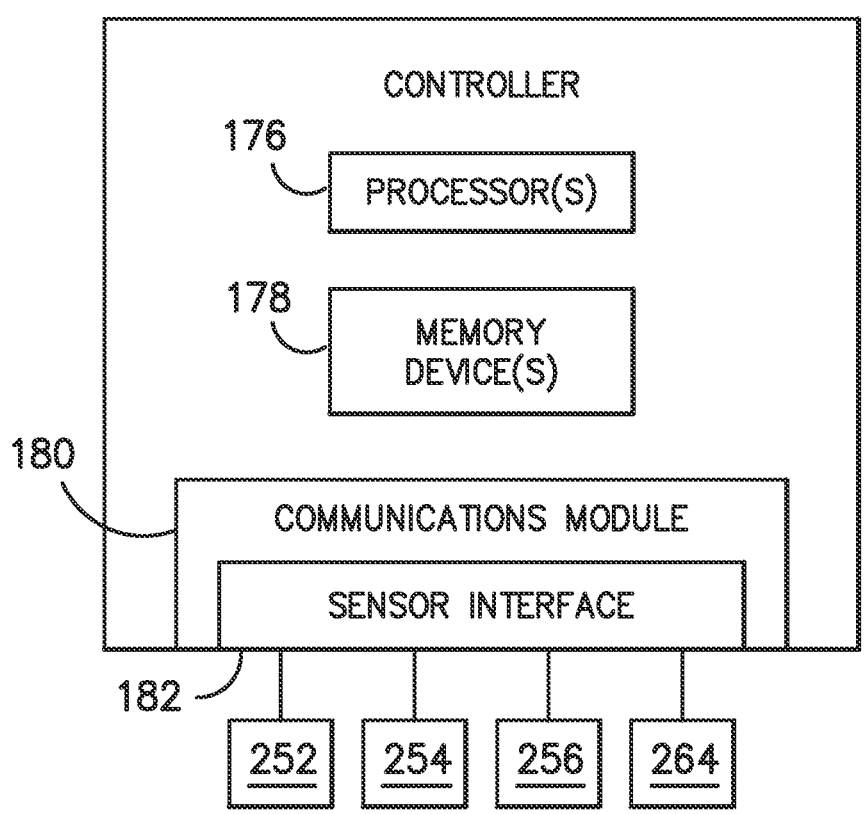
FIG. -3-

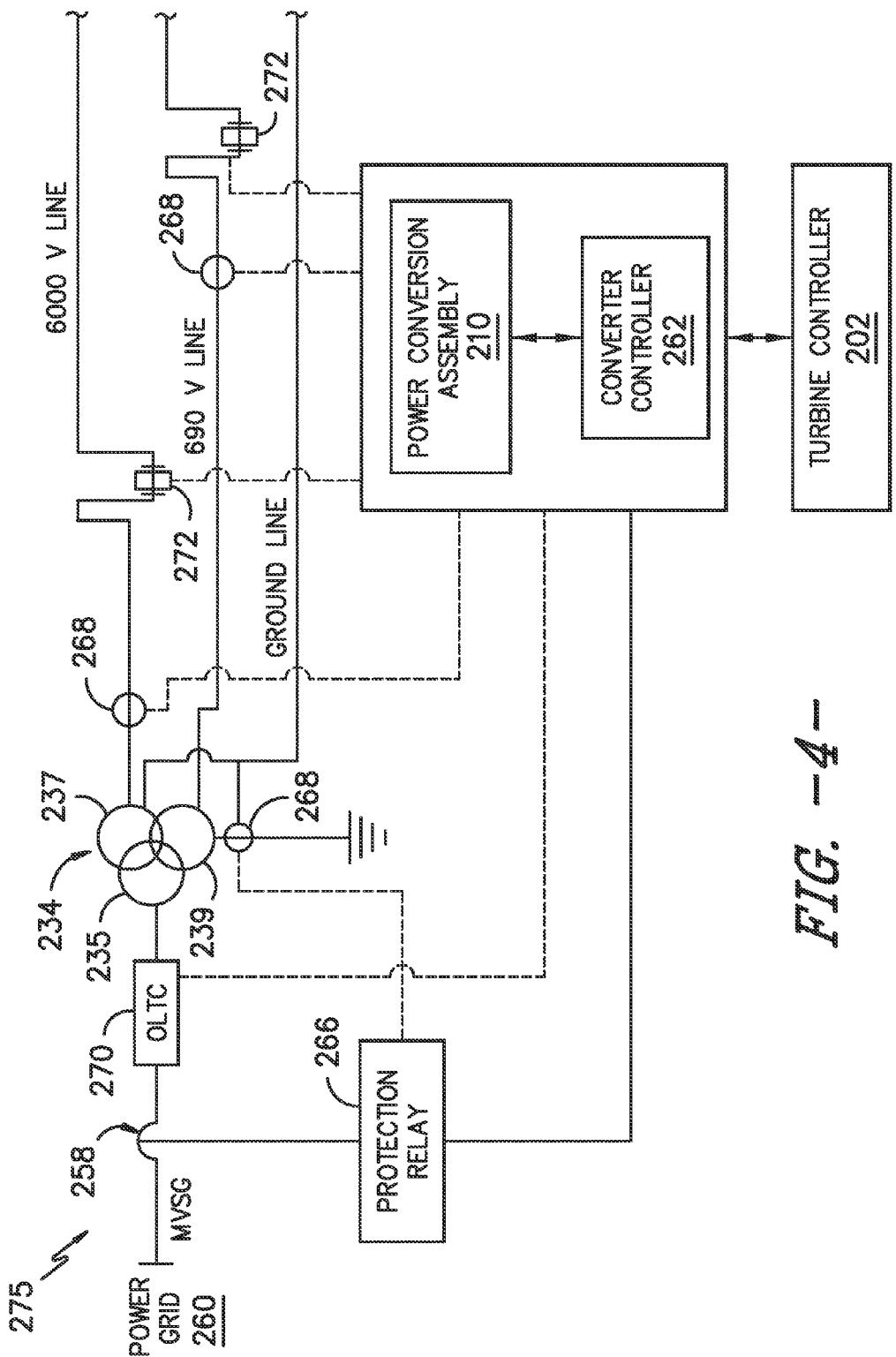
FIG. -4-

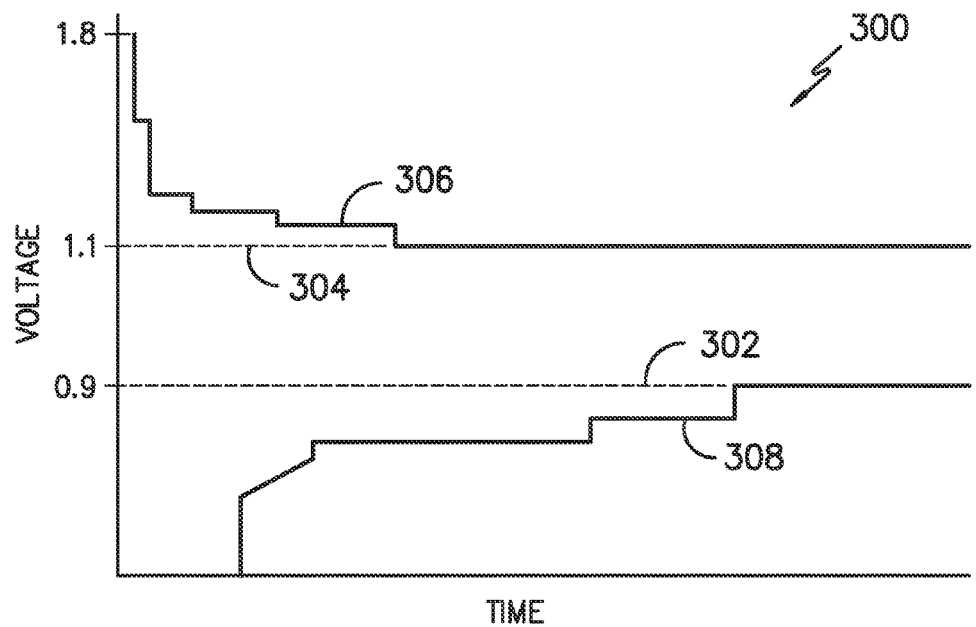
FIG. -5-
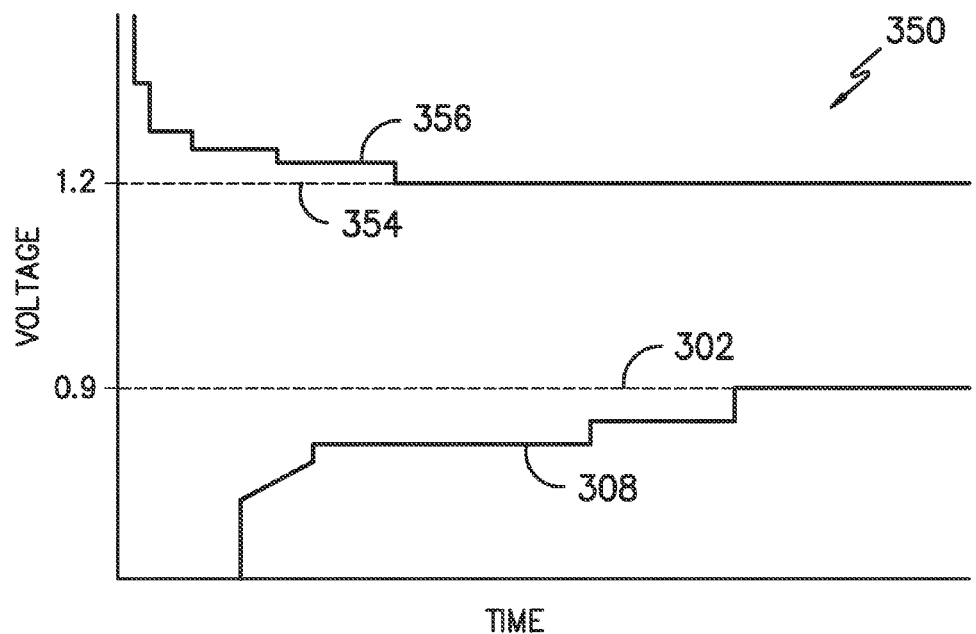
FIG. -6-

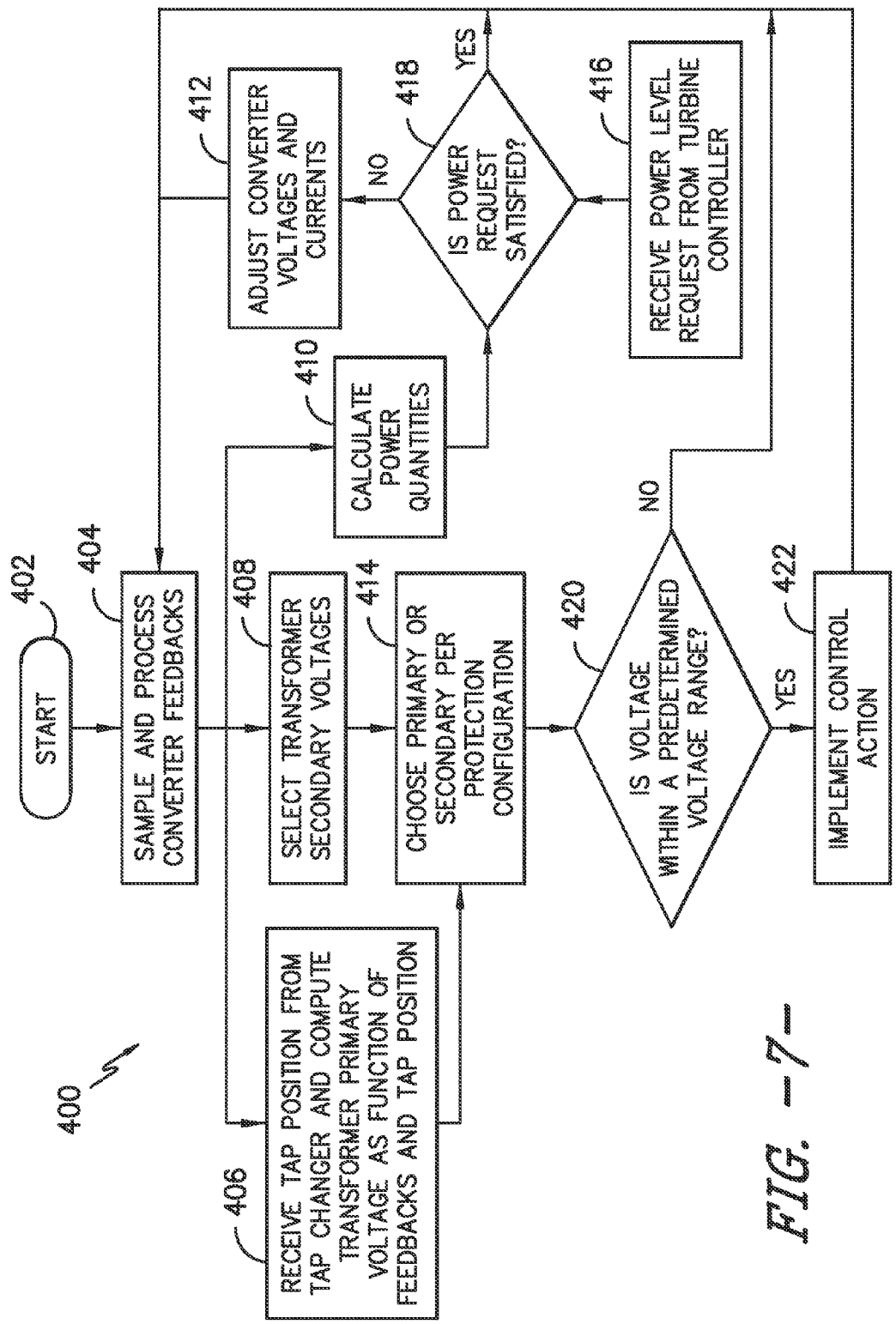
FIG. -7-

SYSTEM AND METHOD FOR OPTIMIZING WIND TURBINE OPERATION

FIELD OF THE INVENTION

The present disclosure relates generally to wind turbines, and more particular to a system and method for optimizing wind turbine operation via a tap changer.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor blades transform wind energy into a mechanical rotational torque that drives one or more generators via the rotor. The generators are sometimes, but not always, rotationally coupled to the rotor through the gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency.

Renewable energy power systems, such as the wind turbine described above, typically includes a power converter with a regulated DC link controlled by a converter controller. More specifically, wind driven doubly-fed induction generator (DFIG) systems or full power conversion systems, typically include a power converter with an AC-DC-AC topology. For many wind turbines, the operating space, and hence value to the customer, is limited by maximum voltages for one or more wind turbine components inherent to DFIG systems. For example, under some operating conditions, the wind turbine may be required to provide reactive power to the power grid, which may impose over-voltage conditions on secondary transformer windings where the power converter is connected. Thus, when the power converter provides reactive power, the resulting voltage may exceed a maximum specified continuous operating voltage level.

In order to mitigate such over-voltage conditions, the converter controller can shift the power factor away from the customer demanded set points; however, this is not always optimal. Further, such limitations tend to be more significant for DFIG generators that operate at a high rated slip (RPM) or for generators that are experiencing an over-speed condition.

Thus, the art is continuously seeking new and improved system and methods for optimizing wind turbine operation for the customer while also maintaining voltage levels within specified operating limits. Accordingly, the present disclosure is directed to a system and method for optimizing wind turbine operation using a tap changer that allows the power grid to extract all available reactive power from the power converter without creating over-voltage conditions.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for optimizing operation of a wind turbine. The method includes determining, via a converter controller of a power converter, a tap position for a tap changer configured between the power grid and a primary winding of the transformer. Another step of the method may also include calculating, via the converter controller, a primary voltage of the primary winding as a function of the tap position. The method also includes implementing, via the converter controller, a control action if the primary voltage or a measured secondary voltage of a secondary winding of the transformer is outside of a predetermined voltage range.

In one embodiment, the step of calculating the primary voltage of the primary winding as a function of the tap position further includes associating the tap position with a corresponding transformer ratio correction. Thus, in additional embodiments, the method may further include calculating the primary voltage of the primary winding as a function of the transformer ratio correction. In another embodiment, the method further includes calculating the primary voltage as a function of one or more of the following: a secondary winding inductance, a converter inductance, one or more secondary winding currents, a primary winding inductance, a frequency, or a transformer impedance.

In further embodiments, the step of implementing the control action may include electrically disconnecting the wind turbine from the power grid. More specifically, in one embodiment, the step of electrically disconnecting the wind turbine from the power grid may include providing a disconnect device between the wind turbine and the power grid and an opening the disconnect device if the primary voltage or the secondary voltage is outside of the predetermined voltage range. In certain embodiments, the disconnect device may include a medium-voltage switch gear, a circuit breaker, a line contactor, a synchronizing switch, or any other suitable device.

In a further embodiment, the tap changer may be an on-load tap changer. In additional embodiments, the wind turbine may include a wind-driven doubly-fed induction generator (DFIG). In yet another embodiment, the transformer may be a three-phase transformer or any other suitable transformer having any number of phases.

In another aspect, the present disclosure is directed to a method for optimizing operation of a wind turbine. The method includes providing a tap changer between a power grid and a primary winding of the transformer. In response to a monitored voltage being outside of a predetermined voltage range, the method also includes changing a tap position of the tap changer so as to cause a change (e.g. a decrease) in a secondary voltage of a second winding of the transformer. Another step includes calculating, via a converter controller, the primary voltage of the primary winding as a function of the tap position. The method also includes controlling the wind turbine based on at least one of the primary voltage or the secondary voltage. It should be understood that the method may also include any of the additional features and/or steps as described herein in regards to the various embodiments.

For example, in various embodiments, the step of controlling the wind turbine based on at least one of the primary voltage or the secondary voltage may include implementing, via the converter controller, a control action if the primary voltage or the secondary voltage exceeds a predetermined voltage threshold.

In yet another aspect, the present disclosure is directed to a system for optimizing operation of a wind turbine. The system includes a tap changer operatively coupled between a power grid and a primary winding of a transformer connected to the power grid, and a controller communicatively coupled with the transformer and the tap changer. The tap changer, via a tap controller or the converter controller, is configured to automatically change tap positions along the primary winding. For example, in certain embodiments, the tap changer includes an individual controller that is configured to determine an appropriate tap position based on programmed settings and/or individual controller feedbacks. In addition, the tap changer may be configured to act upon transformer primary or secondary voltage feedbacks. Further, the controller is configured to perform one or more operations. In one embodiment, for example, the one or more operations include: receiving a tap position from the tap changer, calculating a primary voltage of the primary winding as a function of the tap position or measuring a secondary voltage of the secondary winding, and implementing a control action if the primary voltage or secondary voltage is outside of a predetermined voltage range. It should be understood that the system may also include any of the additional features as described herein in regards to the various embodiments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates one embodiment of a wind turbine according to the present disclosure;

FIG. 2 illustrates one embodiment of an electrical and control system for a wind turbine according to the present disclosure;

FIG. 3 illustrates a block diagram of one embodiment of a controller suitable for use with the wind turbine as shown in FIG. 1;

FIG. 4 illustrates one embodiment of a system for optimizing wind turbine operation according to the present disclosure;

FIG. 5 illustrates one embodiment of a graph of voltage versus time when the tap changer is in-active or absent according to the present disclosure;

FIG. 6 illustrates one embodiment of a graph of voltage versus time when the tap changer is active according to the present disclosure; and FIG. 7 illustrates one embodiment of a flow diagram of a method for optimizing operation of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for optimizing wind turbine operation via a tap changer. More specifically, in various embodiments, the system includes a transformer having at least primary and secondary windings, a tap changer operatively coupled between a power grid and the primary winding of the transformer, and a converter controller communicatively coupled with the transformer and the tap changer. For example, in various embodiments, the tap changer may be an on-load tap changer that is configured to automatically change tap positions via an independent tap controller. Further, in response to a command to provide reactive power to the power grid, the converter controller is configured to receive a tap position from the tap changer, calculate a primary voltage of the primary winding as a function of the tap position and/or measure a secondary voltage of the secondary winding, and implement a control action if the primary or secondary voltages is outside a predetermined voltage range, e.g. above an under-voltage threshold and below an over-voltage threshold.

The present disclosure has many advantages not present in the prior art. For example, the tap changer of the present disclosure allows the power grid to extract all available reactive power without creating overvoltage conditions at the point of turbine connection, i.e. at the secondary winding. More specifically, the converter controller monitors the calculated primary voltage and performs over-voltage protections accordingly. For example, the tap changer and the effective-turns ratio that results from its operation regulate the secondary voltage in steady state conditions (and therefore protect the various wind turbine components). At the same time, the converter controller ensures that the calculated primary voltage, in both steady and transient conditions, remains within safe limits by disconnecting the wind turbine from the power grid if primary voltage is outside of a predetermined voltage range. Thus, the present disclosure optimizes wind turbine operation at times when the power grid imposes demanding conditions that would otherwise be unobtainable due to voltage limitations of the turbine.

Referring now to the drawings, FIG. 1 illustrates a perspective view of a portion of an exemplary wind turbine 100 according to the present disclosure. The wind turbine 100 includes a nacelle 102 housing a generator (not shown in FIG. 1). The nacelle 102 is mounted on a tower 104 (a portion of tower 104 being shown in FIG. 1). The tower 104 may have any suitable height that facilitates operation of wind turbine 100 as described herein. The wind turbine 100 also includes a rotor 106 that includes three rotor blades 108 attached to a rotatable hub 110. Alternatively, the wind turbine 100 may include any number of rotor blades 108 to facilitate operation of the wind turbine 100 as described herein. In one embodiment, the wind turbine 100 includes a gearbox (not shown in FIG. 1) operatively coupled to rotor 106 and a generator (not shown in FIG. 1).

FIG. 2 illustrates a schematic view of one embodiment of an electrical and control system 200 that may be used with the wind turbine 100. As shown, the rotor 106 includes rotor blades 108 coupled to the hub 110. The rotor 106 also includes a low-speed shaft 112 rotatably coupled to the hub 110. The low-speed shaft 112 is coupled to a gearbox 114 that is configured to step up the rotational speed of the low-speed shaft 112 and transfer that speed to a high-speed shaft 116. The gearbox 114 may have any suitable step-up ratio that facilitates operation of wind turbine 100 as described herein. As a further alternative, the wind turbine 100 may include a direct-drive generator that is rotatably coupled to rotor 106 without any intervening gearbox. The high-speed shaft 116 is rotatably coupled to the generator 118. In one embodiment, the generator 118 is may be a wound rotor, three-phase, double-fed induction (asynchronous) generator (DFIG) that includes a generator stator 120 magnetically coupled to a generator rotor 122. In an alternative embodiment, the generator rotor 122 may include a plurality of permanent magnets in place of rotor windings.

The generator stator 120 may also be electrically coupled to a stator synchronizing switch 206 via a stator bus 208. In one embodiment, to facilitate the DFIG configuration, the generator rotor 122 is electrically coupled to a bi-directional power conversion assembly 210 via a rotor bus 212. Alternatively, the generator rotor 122 may be electrically coupled to the rotor bus 212 via any other device that facilitates operation of the electrical and control system 200 as described herein. As a further alternative, the electrical and control system 200 is configured as a full power conversion system (not shown) that includes a full power conversion assembly similar in design and operation to the power conversion assembly 210 and is electrically coupled to the generator stator 120. The full power conversion assembly facilitates channeling electric power between the generator stator 120 and an electric power transmission and distribution grid (not shown). In one embodiment, the stator bus 208 transmits three-phase power from the generator stator 120 to stator synchronizing switch 206. The rotor bus 212 transmits three-phase power from the generator rotor 122 to the power conversion assembly 210. In one embodiment, the stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

In various embodiments, the power conversion assembly 210 may include a rotor filter 218 that is electrically coupled to the generator rotor 122 via the rotor bus 212. A rotor filter bus 219 electrically couples the rotor filter 218 to a rotor-side power converter 220. The rotor-side power converter 220 is electrically coupled to a line-side power converter 222. The rotor-side power converter 220 and line-side power converter 222 are power converter bridges including power semiconductors (not shown). In one embodiment, the rotor-side power converter 220 and the line-side power converter 222 are configured in a three-phase, pulse width modulation (PWM) configuration including insulated gate bipolar transistor (IGBT) switching devices (not shown) that operate as known in the art. Alternatively, the rotor-side power converter 220 and the line-side power converter 222 can have any configuration using any switching devices that facilitate operation of electrical and control system 200 as described herein. The power conversion assembly 210 may also be in electronic data communication with the turbine controller 202 to control the operation of the rotor-side power converter 220 and the line-side power converter 222.

Still referring to FIG. 2, a line-side power converter bus 223 may electrically couple the line-side power converter 222 to a line filter 224. In addition, a line bus 225 may electrically couple the line filter 224 to a line contactor 226. Moreover, the line contactor 226 may be electrically coupled to a conversion circuit breaker 228 via a conversion circuit breaker bus 230. Further, the conversion circuit breaker 228 may be electrically coupled to main transformer circuit breaker 214 via the system bus 216 and a connection bus 232. Alternatively, the line filter 224 is electrically coupled to the system bus 216 directly via the connection bus 232 and includes any suitable protection scheme (not shown) configured to account for removal of the line contactor 226 and the conversion circuit breaker 228 from the electrical and control system 200. The main transformer circuit breaker 214 may be electrically coupled to an electric power main transformer 234 via a generator-side bus 236. Further, the main transformer 234 may be electrically coupled to a grid circuit breaker 238 via a breaker-side bus 240. The grid circuit breaker 238 may be connected to the electric power transmission and distribution grid via a grid bus 242. The three power lines or leads exiting the drawing area on the left of FIG. 2 can correspond to a three-phase power line as described herein. In an alternative embodiment, the main transformer 234 may be electrically coupled to one or more fuses (not shown), rather than to grid circuit breaker 238, via breaker-side bus 240. In another embodiment, neither fuses nor grid circuit breaker 238 is used, but rather main transformer 234 may be coupled to the electric power transmission and distribution grid via breaker-side bus 240 and grid bus 242.

In one embodiment, the rotor-side power converter 220 is coupled in electrical communication with the line-side power converter 222 via a single direct current (DC) link 244. Alternatively, the rotor-side power converter 220 and the line-side power converter 222 are electrically coupled via individual and separate DC links (not shown). In certain embodiments, the DC link 244 may include a positive rail 246, a negative rail 248, and at least one capacitor 250 coupled between the positive rail 246 and the negative rail 248. Alternatively, the capacitor 250 may include one or more capacitors configured in series and/or in parallel between the positive rail 246 and the negative rail 248.

The electrical and control system 200 may also include a converter controller 262 and a higher-level turbine controller 202. Referring particularly to FIG. 2, the controllers 202, 262 may be configured to monitor and control at least some of the operational variables associated with wind turbine 100. For example, in one embodiment, a first set of sensors 252 may be electrically coupled to each of the three phases of the grid bus 242. Alternatively, the voltage and electric current sensors 252 may be electrically coupled to the system bus 216. As a further alternative, the voltage and electric current sensors 252 may be electrically coupled to any portion of the electrical and control system 200 that facilitates operation of the electrical and control system 200 as described herein.

As still a further alternative, the controllers 202, 262 are configured to receive any number of voltage and electric current measurement signals from any number of voltage and electric current sensors 252. For example, in one embodiment, the converter controller 262 may receive voltage and electric current measurement signals from the first set of voltage and electric current sensors 252, a second set of voltage and electric current sensors 254 coupled in electronic data communication with stator bus 208, a third set of voltage and electric current sensors 256 coupled in electronic data communication with rotor bus 212, and/or a fourth set of voltage and electric current sensors 264 coupled in electronic data communication with conversion circuit breaker bus 230. In one embodiment, the second set of voltage and electric current sensors 254 may be substantially similar to the first set of voltage and electric current sensors 252, and the fourth set of voltage and electric current sensors 264 may be substantially similar to the third set of voltage and electric current sensors 256. In addition, the converter controller 262 may be substantially similar to the turbine controller 202 and may be in electronic data communication with the turbine controller 202. Moreover, in one embodiment, the converter controller 262 may be physically integrated within the power conversion assembly 210. Alternatively, the converter controller 262 may have any suitable configuration that facilitates operation of electrical and control system 200 as described herein.

Referring to FIGS. 2 and 3, the converter controller 262 and/or the turbine controller 202 may include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands to the various components of the electrical and control system 200. Additionally, the controllers 202, 262 may also include a communications module 180 to facilitate communications between the controllers 202, 262 and the various components of the electrical and control system 200, e.g. any of the components of FIG. 2. Further, the communications module 180 may include a sensor interface 182 (e.g., one or more analog-to-digital converters) to permit signals transmitted from one or more sensors 252, 254, 256, 264 to be converted into signals that can be understood and processed by the processors 176. It should be appreciated that the sensors 252, 254, 256, 264 may be communicatively coupled to the communications module 180 using any suitable means. For example, as shown in FIG. 3, the sensors 252, 254, 256, 264 are coupled to the sensor interface 182 via a wired connection. However, in other embodiments, the sensors 252, 254, 256, 264 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 202 to perform the various functions as described herein.

During operation, wind impacts the rotor blades 108 and the blades 108 transform wind energy into a mechanical rotational torque that rotatably drives the low-speed shaft 112 via the hub 110. The low-speed shaft 112 drives the gearbox 114 that subsequently steps up the low rotational speed of the low-speed shaft 112 to drive the high-speed shaft 116 at an increased rotational speed. The high speed shaft 116 rotatably drives the generator rotor 122. A rotating magnetic field is induced by the generator rotor 122 and a voltage is induced within the generator stator 120 that is magnetically coupled to generator rotor 122. The generator 118 converts the rotational mechanical energy to a sinusoidal, three-phase alternating current (AC) electrical energy signal in the generator stator 120. The associated electrical power is transmitted to the main transformer 234 via the stator bus 208, the stator synchronizing switch 206, the system bus 216, the main transformer circuit breaker 214, and the generator-side bus 236. The main transformer 234 steps up the voltage amplitude of the electrical power and the transformed electrical power is transmitted to a grid via breaker-side bus 240, grid circuit breaker 238, and the grid bus 242.

In one embodiment, a second electrical power transmission path is also provided. For example, electrical, three-phase, sinusoidal, AC power may be generated within the generator rotor 122 and may be transmitted to the power conversion assembly 210 via the rotor bus 212. Within the power conversion assembly 210, the electrical power may be transmitted to the rotor filter 218 such that the electrical power is modified for the rate of change of the PWM signals associated with the rotor-side power converter 220. The rotor-side power converter 220 acts as a rectifier and rectifies the sinusoidal, three-phase AC power to DC power. The DC power is transmitted into the DC link 244. The capacitor 250 facilitates mitigating the DC link 244 voltage amplitude variations by facilitating mitigation of a DC ripple associated with AC rectification.

The DC power is subsequently transmitted from the DC link 244 to the line-side power converter 222 and the line-side power converter 222 acts as an inverter configured to convert the DC electrical power from the DC link 244 to three-phase, sinusoidal AC electrical power with pre-determined voltages, currents, and frequencies. This conversion is monitored and controlled via the converter controller 262. The converted AC power is transmitted from the line-side power converter 222 to the system bus 216 via the line-side power converter bus 223, the line bus 225, the line contactor 226, the conversion circuit breaker bus 230, the conversion circuit breaker 228, and the connection bus 232. The line filter 224 compensates or adjusts for harmonic currents in the electric power transmitted from the line-side power converter 222. The stator synchronizing switch 206 is configured to facilitate connecting the three-phase power from generator stator 120 with the three-phase power from power conversion assembly 210.

The conversion circuit breaker 228, the main transformer circuit breaker 214, and the grid circuit breaker 238 are configured to disconnect corresponding buses, for example, when excessive current flow may damage the components of electrical and control system 200. Additional protection components may also be provided including line contactor 226, which may be controlled to form a disconnect by opening a switch (not shown in FIG. 2) corresponding to each line of the line bus 225.

Referring now to FIG. 4, one embodiment of a system 275 for optimizing operation of the wind turbine 100 is illustrated. As shown, the system 275 may utilize existing components of the electrical and control system 200. Alternatively, the system 275 may be integrated within the existing electrical and control system 200. More specifically, as shown in the illustrated embodiment, the system 275 includes the main transformer 234 and at least one tap changer 270 operatively coupled between the power grid 260 and the transformer 234. The main transformer 234 may have any number of windings, including, for example, a primary winding 235 and one or more secondary windings 237, 239. As such, the tap changer 270 may be operatively configured with the primary winding 235 of the transformer 234 on the power grid 260 side. As used herein, a tap changer generally refers to a connection-point selection mechanism along a power transformer winding that allows a variable number of turns to be selected in discrete steps. Thus, a transformer having a variable-turns ratio can be produced, enabling stepped voltage regulation of the output. More specifically, in one embodiment, the tap changer 270 may be an on-load tap changer (OLTC). For example, for many power transformer applications, a supply interruption during a tap change is unacceptable. Thus, on-load tap changers can change tap position without interrupting the power supply. In addition, the tap changer 270 may include a tap controller that is configured to automatically change tap positions while the tap changer is active. Alternative, the tap changer may be manually operated to change tap positions.

During operation, the converter controller 262 is configured to receive control signals from the turbine controller 202. For example, oftentimes, the turbine controller 202 will require the power conversion assembly 210 to provide a power level (e.g. reactive power) to the power grid 260 based on certain operating conditions. The control signals may be based on sensed conditions or operating characteristics of the wind turbine 100 and the electrical and control system 200 and/or one or more various grid conditions. The sensed conditions or operating characteristics are received by the turbine controller 202 and used to control operation of the power conversion assembly 210 via, for example, the converter controller 262. More specifically, in exemplary embodiments, the tap changer 270 may continuously send its tap position to the converter controller 262. Further, the tap changer 270 may change its tap position in response to reactive current (or grid voltage change or active current) that causes the transformer secondary voltage to change. The converter controller 262 can then use the tap position to calculate a primary voltage of the primary winding 235. More specifically, in certain embodiments, the converter controller 262 is configured to convert the tap position into a transformer ratio correction. For example, in one embodiment, the converter controller 262 may contain one or more look-up tables stored therein that contains all possible tap positions and corresponding transformer ratio corrections. As such, the converter controller 262 may receive the tap position and associate the tap position with a corresponding transformer ratio correction that may be used in the primary voltage calculation.

For example, in particular embodiments, the converter controller 262 may calculate the primary voltage of the primary winding 235 as a function of one or more of the following: a secondary winding inductance, a converter inductance, one or more secondary winding currents, a primary winding inductance, a frequency, or a transformer impedance. As shown in FIG. 4, such operating parameters may be obtained via one or more additional current or voltage sensors 268, 272 that may be added to the existing electrical and control system 200 or via one of the existing sensors 252, 254, 256, 264 as described herein. More specifically, in one embodiment, the converter controller 262 may calculate the primary voltage of the primary winding 235 by calculating a voltage drop of the primary side using the current flowing through the primary side, the inductance of the primary winding 235, and/or the frequency. Since the current flowing through the primary winding 235 is not typically directly measured, the converter controller 262 is configured to estimate the total current by adding the currents of all secondary windings 237, 239. Optionally, the converter controller 262 may also consider the voltage drop of one or more of the secondary winding 237, 239 in the primary voltage calculation. In such embodiments, the converter controller 262 calculates the voltage drop of one or more of the secondary windings 237, 239 using the inductance of the secondary winding, the inductance of the power converter 210, and the current flowing through the secondary windings 237, 239.

Thus, the primary voltage may be calculated via the voltage drop of the primary side alone or in combination with the voltage drop of one or more of the secondary sides. For example, in certain embodiments, the converter controller 262 calculates the primary voltage by converting (e.g. by multiplying or dividing) the voltage drop from the primary side (and optionally the secondary side) by the transformer ratio correction obtained from the tap position look-up table. The resulting conversion represents the calculated primary voltage of the primary winding 235.

The converter controller 262 continuously calculates the primary voltage while the tap changer 270 is enabled such that the controller 262 can ensure that the primary voltage is operating within safe limits, i.e. within a predetermined voltage range. If the calculated primary voltage remains within the predetermined voltage range, then the converter controller 262 continues to operate under normal operation. If, however, the calculated primary voltage is outside of the predetermined voltage range, then the converter controller 262 is configured to implement a control action. In addition, the converter controller 262 can continuously monitor the secondary voltage of the secondary windings 237, 239 to ensure that the secondary voltages are operating within the predetermined voltage range.

In the event that the primary or secondary voltages are outside of the predetermined voltage range, the wind turbine 100 may be electrically disconnected from the power grid 260. More specifically, in certain embodiments, the power converter 210 of the wind turbine 10 may be electrically disconnected from the secondary windings 237, 239 of the transformer 234, e.g. by opening line contactor 226 or conversion circuit breaker 228. Alternatively, as shown in FIG. 4, the system 275 may include a disconnect device, e.g. a medium-voltage switch gear (MVSG) 258, communicatively coupled to the converter controller 262 and an optional protection relay 266 configured between the disconnect device and the power grid 260. More specifically, as shown, the MVSG 258 may be configured between the power grid 260 and the tap changer 270 such that when the primary voltage is outside of the predetermined voltage range, the converter controller 262 is configured to trip or open the disconnect device so as to electrically disconnect the system 275 from the power grid 260. In alternative embodiments, the MVSG 258 may be configured between the converter controller 262 and the main transformer 234 such that when the secondary voltage is outside of the predetermined voltage range, the converter controller 262 is configured to trip or open the disconnect device so as to electrically disconnect the system 275 from the power grid 260. In still further embodiments, the disconnect device may include any other suitable device configured to electrically disconnect the system 275 from the power grid 260 so as to protect the turbine 100 from out-of-range voltage conditions.

Various advantages of optimizing wind turbine operation according to the present disclosure are also illustrated in FIGS. 5 and 6. As shown in FIG. 5, a graph 300 of voltage versus time when the tap changer is in-active or absent is illustrated, whereas FIG. 6 illustrates a graph 350 of voltage versus time when the tap changer 270 is active. Each of the graphs 300, 350 illustrate an under-voltage threshold 302 and over-voltage thresholds 304, 354, respectively. Such thresholds or protection settings may be customized in relation to grid codes and/or particular customer needs. Thus, the protection settings are typically equal to or lower than the capability curve or envelope enforced by the power conversion assembly 210 such that certain over-voltage conditions cannot occur. The under-voltage thresholds 302 are typically not affected by the OLTC function. Accordingly, when the OLTC function is active (FIG. 6), the over-voltage threshold 354 may be increased by a certain factor to allow for higher voltages in the primary winding 235 (and therefore more extracted reactive power). Further, the over-voltage threshold 354 may be based on the calculated primary voltage when the OLTC function is active. Similarly, when the tap changer 270 is in-active, the over-voltage threshold 304 is typically based on the primary and/or secondary voltages.

In an exemplary embodiment, for example, the secondary winding 239 voltage may be 1.09 pu (i.e. 9% above nominal) and the primary winding 235 voltage may be 1.11 pu as shown in the illustrated embodiment. At such a time, the wind turbine 100 may be extracting rated active power, e.g. 2.7 MW, from the wind at a unity power factor, which translates into zero reactive power. The turbine controller 202 may then command the converter controller 262 to maintain power extraction at the current level while also providing 0.9 MVAR of reactive power. In order for the wind turbine 100 to achieve the new operating point, the secondary winding 239 voltage would normally have to increase, e.g. up to 1.12 pu (i.e. 12% above nominal), which will eventually cause an over-voltage trip per wind turbine design constraints. To avoid the over-voltage trip, the tap changer 270 of the present disclosure assumes a tap position that reduces the secondary voltage by a certain amount, e.g. 1.08 pu. When the new operating point is satisfied, the primary voltage is larger than the original voltage amount as shown in FIG. 6, e.g. from about 1.11 pu to about 1.2 pu, which is acceptable for the grid 260 and the primary winding 235, yet the secondary voltage is within safe limits.

Referring now to FIG. 7, a flow diagram of an example method 400 for optimizing operation of a wind turbine is illustrated via the converter controller 262. As shown, at 402, the method 400 begins. At 404, the converter controller 262 samples and processes converter feedbacks. At 406, the converter controller 262 receives a tap position from the tap changer and computes the primary voltage of the transformer as a function of the feedbacks and the tap position. In addition, at 408, the converter controller 262 selects or determines secondary voltages of the transformer. Based on 406 and 408, the converter controller 262 chooses the primary or secondary voltages per certain protection configurations at 414. At 420, the converter controller 262 determines whether the chosen voltage is within a predetermined voltage range. If the voltage is outside of the predetermined voltage range, then at 422, the converter controller 262 implements a control action. For example, as mentioned, the converter controller 262 may send a trip signal to the line contactor 226, the conversion circuit breaker 228, or the grid disconnect device 258. At 410, the converter controller 262 is also configured to calculate power quantities and at 416, the converter controller 262 receives a power level request from the turbine controller 202. As such, at 418, the converter controller 262 determines whether the power request is satisfied. If not, the converter controller 262 adjusts converter voltages and currents at 412. If yes, the method 400 continues again at 404.

Exemplary embodiments of a wind turbine, a control system for a wind turbine, and methods of optimizing operation of a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing operation of a wind turbine power system connected to a power grid, the method comprising:

receiving, via a converter controller of a power converter of the wind turbine power system, a tap position of a tap changer configured between the power grid and a primary winding of a transformer of the wind turbine power system;

associating the tap position with a corresponding transformer ratio correction via a look-up table;

calculating, via the converter controller, a grid-side primary voltage of the primary winding by multiplying the transformer ratio correction and a transformer impedance;

measuring a secondary voltage of a secondary winding of the transformer; and, electrically disconnecting, via a disconnect device, the wind turbine power system from the power grid by opening the disconnect device if the calculated grid-side primary voltage or the measured secondary voltage is outside of a predetermined voltage range.

2. The method of claim 1, further comprising calculating the grid-side primary voltage as a function of one or more of the following: a secondary winding voltage drop or one or more secondary winding currents.

3. The method of claim 1, wherein the disconnect device comprises at least one of a circuit breaker, a line contactor, or a synchronizing switch.

4. The method of claim 1, wherein the tap changer comprises an on-load tap changer.

5. The method of claim 1, wherein the wind turbine power system comprises a wind-driven doubly-fed induction generator (DFIG).

6. The method of claim 1, wherein the transformer comprises a three-phase transformer.

7. The method of claim 1, further comprising calculating the grid-side primary voltage as a function of one or more of the following: a secondary winding inductance, a converter inductance, a primary winding inductance, or a frequency.

8. The method of claim 1, wherein the disconnect device comprises a switchgear.

9. A method for optimizing operation of a wind turbine power system connected to a power grid, the method comprising:
    providing a tap changer between the power grid and a primary winding of a transformer of the wind turbine power system;
    in response to a monitored voltage of the wind turbine power system being outside of a predetermined voltage range, changing a tap position of the tap changer, wherein changing the tap position of the tap changer causes a change in a secondary voltage of a second winding of the transformer;
    associating the tap position with a corresponding transformer ratio correction via a look-up table;
    calculating, via a converter controller, a grid-side primary voltage of the primary winding by multiplying the transformer ratio correction and a transformer impedance; and,
    controlling the wind turbine power system by opening a disconnect device if the calculated grid-side primary voltage or the secondary voltage is outside of a predetermined voltage range.

10. The method of claim 9, further comprising calculating the grid-side primary voltage as a function of one or more of the following: a secondary winding inductance, a converter inductance, a primary winding inductance, or a frequency.

11. The method of claim 9, wherein the tap changer comprises an on-load tap changer.

12. The method of claim 9, further comprising calculating the grid-side primary voltage as a function of one or more of the following: a secondary winding inductance, a converter inductance, a primary winding inductance, or a frequency.

13. The method of claim 9, wherein the switchgear comprises a medium-voltage switchgear.

14. The method of claim 9, wherein the tap changer comprises an on-load tap changer.

15. A system for optimizing operation of a wind turbine power system connected to a power grid, the system comprising:
    a tap changer operatively coupled between the power grid and a primary winding of a transformer of the wind turbine power system, the tap changer being configured to automatically change tap positions; and,
    a controller operatively coupled with the transformer and the tap changer, the controller configured to perform one or more operations, the one or more operations comprising:
    receiving a tap position from the tap changer,
    associating the tap position with a corresponding transformer ratio correction via a look-up table;
    calculating a grid-side primary voltage of the primary winding by multiplying the transformer ratio correction and a transformer impedance,
    measuring a secondary voltage of a secondary winding of the transformer, and
    electrically disconnecting the wind turbine power system from the power grid if the calculated grid-side primary voltage or the secondary voltage is outside of a predetermined voltage range.

16. The method of claim 15, further comprising calculating the grid-side primary voltage as a function of one or more of the following: a secondary winding voltage drop, a secondary winding inductance, a converter inductance, one or more secondary winding currents, a primary winding inductance, or a frequency.

17. The method of claim 15, further electrically disconnecting the wind turbine power system from the power grid if the calculated grid-side primary voltage or the secondary voltage is outside of a predetermined voltage range via at least one of a switchgear, a circuit breaker, a line contactor, or a synchronizing switch.

* * * * *